US011061144B2

(12) United States Patent
Thatcher

(10) Patent No.: US 11,061,144 B2
(45) Date of Patent: Jul. 13, 2021

(54) SYSTEM AND METHOD FOR GPS ALIGNMENT USING REAL-TIME KINETICS

(71) Applicant: Valmont Industries, Inc., Omaha, NE (US)

(72) Inventor: Tracy A. Thatcher, Gretna, NE (US)

(73) Assignee: Valmont Industries, Inc., Omaha, NE (US)

( * ) Notice: Subject to any disclaimer, the term of this patent is extended or adjusted under 35 U.S.C. 154(b) by 172 days.

(21) Appl. No.: 16/252,802

(22) Filed: Jan. 21, 2019

(65) Prior Publication Data

US 2019/0235091 A1    Aug. 1, 2019

Related U.S. Application Data

(60) Provisional application No. 62/623,587, filed on Jan. 30, 2018.

(51) Int. Cl.
*G01S 19/43* (2010.01)
*G05D 1/02* (2020.01)
(Continued)

(52) U.S. Cl.
CPC ............ *G01S 19/43* (2013.01); *A01G 25/092* (2013.01); *G01S 19/14* (2013.01); *G01S 19/51* (2013.01);
(Continued)

(58) Field of Classification Search
CPC .... A01G 25/092; A01G 25/09; G05D 1/0278; G05D 1/0219; G05D 1/028;
(Continued)

(56) References Cited

U.S. PATENT DOCUMENTS

| 4,138,705 A | 2/1979 | Doll |
| 6,290,151 B1 * | 9/2001 | Barker ................. A01G 25/092 |
| | | 239/69 |

(Continued)

FOREIGN PATENT DOCUMENTS

WO        9728692 A1    8/1997

*Primary Examiner* — Behrang Badii
*Assistant Examiner* — Daniel L Greene
(74) *Attorney, Agent, or Firm* — Milligan PC LLO

(57) ABSTRACT

A system and method for providing power and alignment control within an irrigation system having at least two spans and a drive system for moving the spans. According to a first preferred embodiment, the present invention includes a method for maintaining the alignment which includes the steps of: receiving a first set of Global Positing System (GPS) location data and second set of Real-Time Kinematics (RTK) error data; comparing the first set of GPS location data with the second set of RTK error data; calculating RTK error correction data; transmitting RTK error correction data to the intermediate drive towers and the last drive tower; calculating the location of the last drive tower using GPS data and RTK error correction data; calculating a straight, center line between the center pivot and the last drive unit; calculating the relative distances between each intermediate drive tower and the calculated center line using a linear regression algorithm; and controlling the average speed over time of each intermediate drive tower to reduce distance between their current locations the calculated center line The present invention provides a system for aligning drive towers within an irrigation system.

2 Claims, 8 Drawing Sheets

(51) Int. Cl.
  *G01S 19/51*   (2010.01)
  *A01G 25/09*   (2006.01)
  *G01S 19/14*   (2010.01)

(52) U.S. Cl.
  CPC ........... *G05D 1/028* (2013.01); *G05D 1/0219* (2013.01); *G05D 1/0278* (2013.01); *G05D 2201/0201* (2013.01)

(58) Field of Classification Search
  CPC . G05D 2201/0201; G01S 19/51; G01S 19/14; G01S 9/43; G05B 2219/2625; B05B 12/124; H02J 13/00007
  See application file for complete search history.

(56) References Cited

U.S. PATENT DOCUMENTS

| | | | |
|---|---|---|---|
| 6,512,992 B1* | 1/2003 | Fowler | A01B 79/005 |
| | | | 701/50 |
| 6,923,390 B1* | 8/2005 | Barker | A01G 25/092 |
| | | | 239/728 |
| 2006/0027677 A1* | 2/2006 | Abts | A01G 25/092 |
| | | | 239/67 |
| 2007/0272510 A1 | 11/2007 | Kawakami | |
| 2011/0153161 A1* | 6/2011 | Grabow | A01G 25/092 |
| | | | 701/41 |
| 2012/0010782 A1* | 1/2012 | Grabow | A01G 25/092 |
| | | | 701/41 |
| 2015/0316111 A1 | 11/2015 | Tanabe et al. | |
| 2015/0351335 A1 | 12/2015 | Abts et al. | |
| 2017/0131718 A1* | 5/2017 | Matsumura | G05D 1/021 |
| 2019/0052197 A1* | 2/2019 | Thatcher | H02P 3/24 |

\* cited by examiner

SYSTEM AND METHOD FOR GPS ALIGNMENT USING REAL-TIME KINETICS

RELATED APPLICATIONS

The present application claims priority to U.S. Provisional Application No. 62/623,587 filed Jan. 30, 2018.

BACKGROUND AND FIELD OF THE PRESENT INVENTION

Field of the Present Invention

The present invention relates generally to a system and method for alignment control of irrigation spans and, more particularly, to a system and method for GPS alignment of irrigation spans using real-time kinetics sent via power line carrier.

Background of the Invention

Modern center pivot and linear irrigation systems generally include interconnected spans (e.g., irrigation spans) supported by one or more tower structures to support the conduits (e.g., water pipe sections). In turn, the conduits are further attached to sprinkler/nozzle systems which spray water (or other applicants) in a desired pattern. In these modern irrigation systems, a significant number of powered elements are used to control various aspects of irrigation. These often include remote, independent power for a variety of sensors, sprayers, drive control systems, motors and transducers.

In operation, control and powering of each of these powered elements is accomplished via systems of electro-mechanical devices including relays, switches and other devices with moving parts. Given their size and complexity, modern irrigation machines are prone to repeated mechanical and electrical breakdowns. One important source of mechanical breakdowns is misalignment of drive towers. With the large spacing between each drive tower of an irrigation span, significant stress and shearing force can be created with even a minimal amount misalignment. The primary method of controlling alignment in conventional irrigation systems relies upon electromagnetic switches which are used to control the operations of individual drive motors. These systems have large response times and lack the ability to fine-tune alignment changes. Further, these types of systems rely on mechanical linkages between individual spans. As such they are susceptible to changes in span orientation (span roll) due to wind, terrain or the like. Further these systems utilize a fairly wide alignment error band before a motor is started or stopped, typically on the order of ±1.5 degrees misalignment, thus causing the high structural stresses discussed above.

A new alternative method for alignment control relies upon individual (IPS receivers which inform each individual drive tower regarding location and alignment. These systems are prone to slow response times due to the transmission lags. Further, GPS based systems without some type of correction (such as RTK, WARS, D-GPS, or the like) all suffer from a significant margin of error which is generally too large to be useful when fine tuning the alignment of irrigation spans.

To overcome the limitations of the prior art, a reliable and effective system is needed to control and align irrigation spans and drive towers.

SUMMARY OF THE PRESENT INVENTION

To address the shortcomings presented in the prior art, the present invention provides a system for providing power and alignment control within an irrigation system having at least two spans and a drive system for moving the spans. According to a first preferred embodiment, the present invention includes a method for maintaining the alignment of an irrigation system having a plurality of connected spans and a plurality of drive towers for moving the connected span around a center pivot. Alternatively, a linear cart could be substituted for the center pivot.

According to a further preferred embodiment, the method of present invention includes the steps of: receiving a first set of GPS location data and second set of RTK error data; comparing the first set of GPS location data with the second set of RTK error data; calculating RTK error correction data; transmitting RTK error correction data to the intermediate drive towers and the last drive tower; calculating the location of the last drive tower using GPS data and RTK error correction data; calculating a straight, center line between the center pivot and the last drive unit; calculating the relative distances between each intermediate drive tower and the calculated center line using a linear regression algorithm; and controlling the average speed over time of each intermediate drive tower to reduce distance between their current locations the calculated center line.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
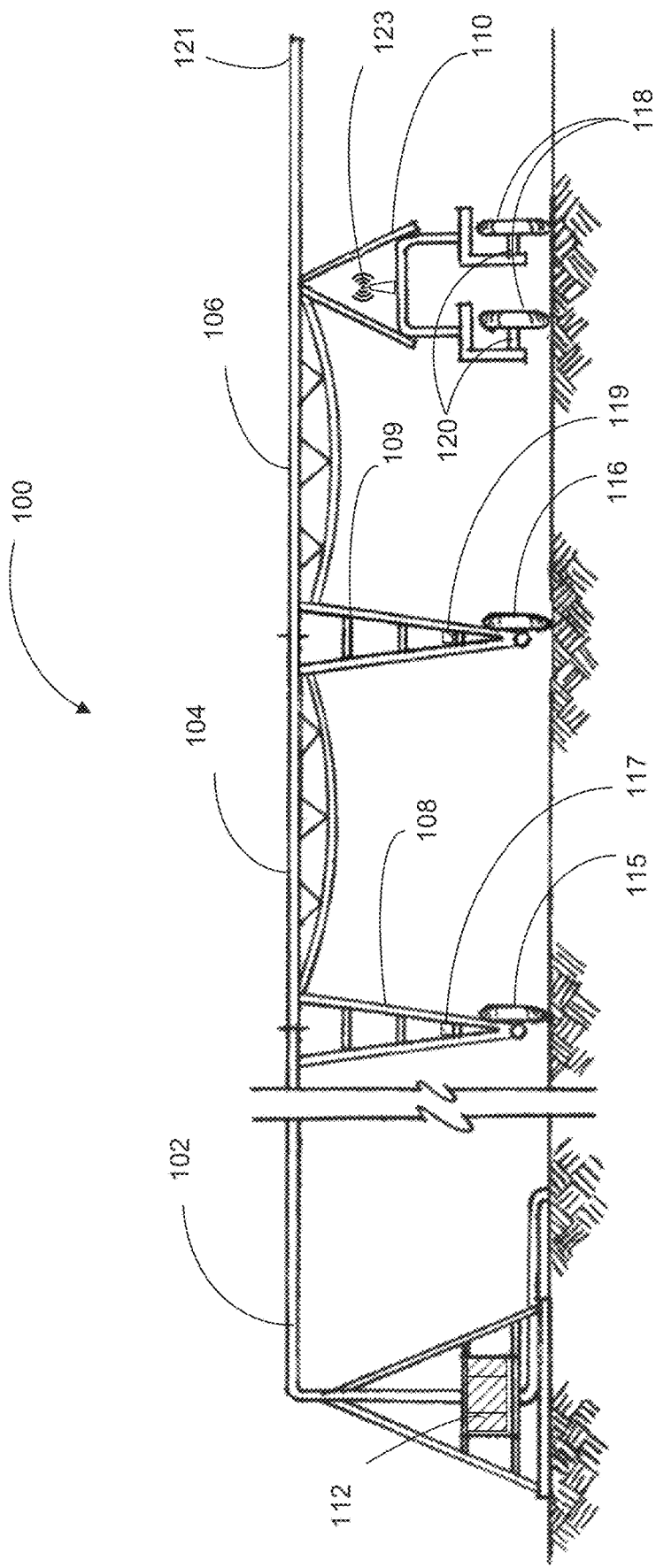
FIG. 1 shows an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

In accordance with preferred embodiments of the present invention, it should be understood that the term "drive unit" may preferably include a number of sub-components including: a motor, a controller, a communication device (such as a PLC or the like) and an alignment device. Further, while the invention is discussed below respect to three exemplary towers, the number of towers used may be expanded or reduced (i.e. 2-100 towers as needed without departing from the spirit of the present invention. Further, the term "motor" as used herein may refer to any suitable motor for providing torque to a drive wheel. Accordingly, the term "motor" as used herein may preferably include motors such switch reluctance motors, induction motors and the like.

The terms "program," "computer program," "software application," "module," "firmware" and the like as used herein, are defined as a sequence of instructions designed for execution on a computer system. The term "solid state" should be understood to refer to a range of solid state electronic devices which preferably include circuits or devices built from solid materials and in which the electrons, or other charge carriers, are confined entirely within the solid material. Exemplary solid-state components/materials may include crystalline, polycrystalline and amorphous solids, electrical conductors and semiconductors. Common solid-state devices may include transistors, microprocessor chips, and RAM.

A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Of course, the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies silicon-conjugated polymer and metal-conjugated polymer-metal structure), bidirectional triode thyristors (TRIAC), mixed analog and digital, and the like.

FIG. 1 illustrates an exemplary self-propelled irrigation system 100 which may be used with example implementations of the present invention. As should be understood, the irrigation system 100 disclosed in FIG. 1 is an exemplary irrigation system onto which the features of the present invention may be integrated. Accordingly, FIG. 1 is intended to be illustrative and any of a variety of systems (i.e. fixed systems as well as linear and center pivot self-propelled irrigation systems; stationary systems; corner systems) may be used with the present invention without limitation.

With reference now to FIG. 1, spans 102, 104, 106 are shown supported by drive towers 108, 109, 110. Further, each drive tower 108, 109, 110 is shown with respective motors 117, 119, 120 which provide torque to the drive wheels 115, 116, 118. As further shown in FIG. 1, the irrigation machine 100 may preferably further include an extension/overhang 121 which may include an end gun (not shown). As further shown, a position sensor 123 may be provided to provide positional and angular orientation data for the system of the present invention as discussed further below. As further shown, a control panel 112 is shown for enclosing elements of an exemplary control device 150 as discussed further below. It should be further understood that FIG. 1 provides an illustration of an irrigation machine 100 without many added powered elements and sensors. However, any of a variety of different sensing systems may be added without limitation.

Figure 2:
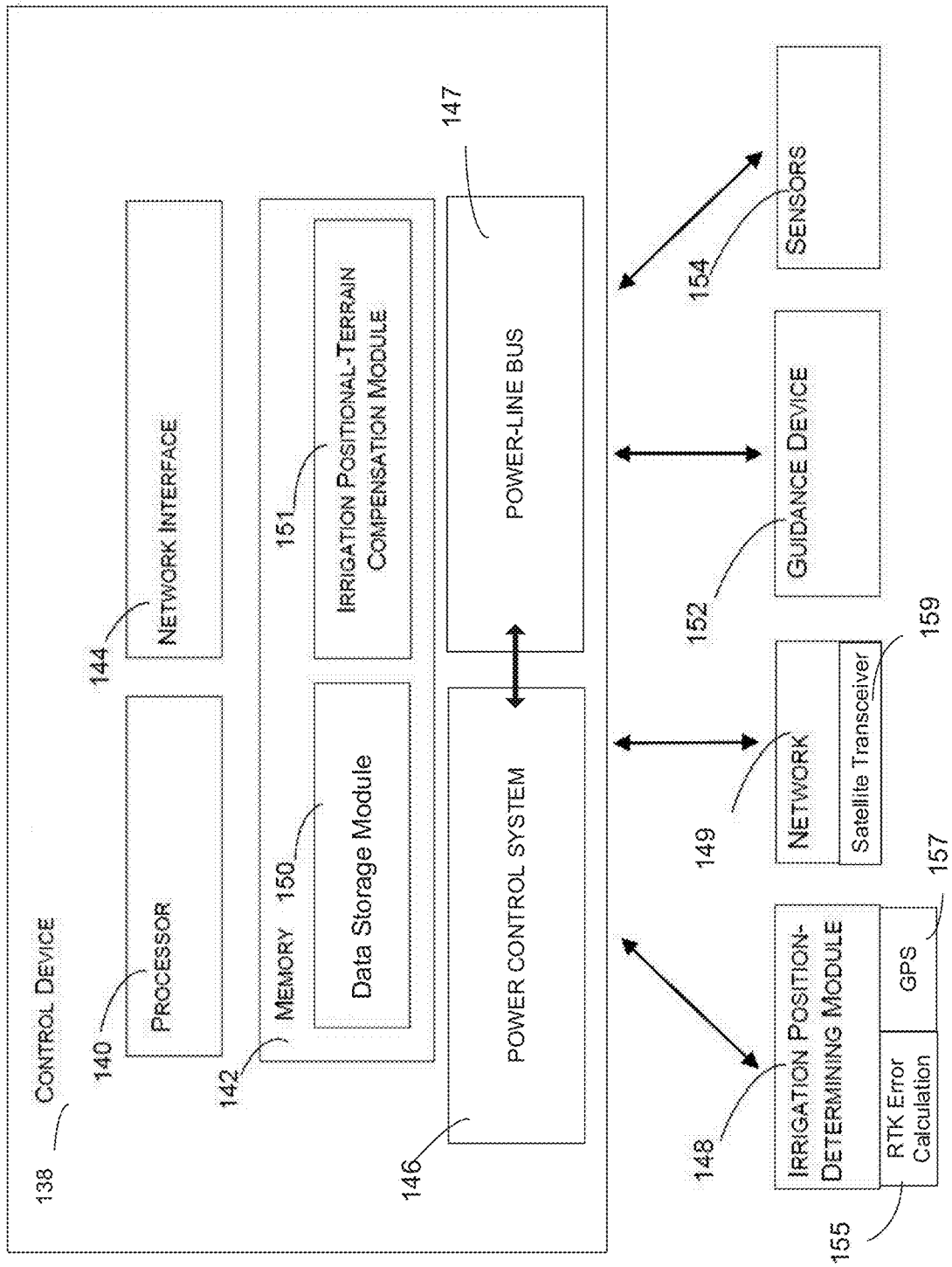
FIG. 2 shows a block diagram illustrating the exemplary processing architecture of a control device in according with a first preferred embodiment of the present invention.

With reference now to FIG. 2, an exemplary control device 138 which represents functionality to control one or more operational aspects of the irrigation system 100 will now be discussed. As shown, an exemplary control device 138 preferably includes a processor 140, a memory 142, a positioning module 151, a data storage module 150 and a network interface 144. The processor 140 provides processing functionality for the control device 138 and may include any number of processors, micro-controllers, or other processing systems. The processor 140 may execute one or more software programs that implement techniques described herein. The memory 142 is an example of tangible computer-readable media that provides storage functionality to store various data associated with the operation of the control device 138, such as the software program and code segments mentioned above, or other data to instruct the processor 140 and other elements of the control device 138 to perform the steps described herein. The memory 142 may include, for example, removable and non-removable memory elements such as RAM, RUM, Flash (e.g., SD Card, mini-SD card, micro-SD Card), magnetic, optical, USB memory devices, and so forth. The network interface 144 provides functionality to enable the control device 138 to communicate with one or more networks 149 through a variety of components such as wireless access points, transceivers and so forth, and any associated software employed by these components (e.g., drivers, configuration software, and so on). As shown, a preferred system of the present invention a include a satellite transceiver 159 or the like for receiving direct satellite communications.

In implementations, exemplary control device 138 preferably further includes a power control system 146 and a power-line BUS 147 which may include conductive transmission lines, circuits and the like for controlling and routing electric power, controlling its quality, and controlling the devices attached to a power-line carrier system as discussed further below. Further, the system of the present invention preferably may further include an irrigation position-determining module 148 (alternatively referred to herein as the "Base Station Module" or "BSM") which may further include a global positioning system (GTS) receiver 157 or the like to calculate a location of the irrigation system 100. In accordance with a further preferred embodiment of the present invention, the irrigation position determining module 148/BSM preferably further includes a real-time kinematics (WM) Error Calculation Module 155 as discussed further below. According to preferred embodiments, the processing of PAX signals as discussed herein may preferably be conducted using a single frequency or dual frequencies without limitation.

As further shown, control device 138 may be coupled to a guidance device or similar system 152 of the irrigation system 100 (e.g., steering assembly or steering mechanism) to control movement of the irrigation system 100. As shown, the control device 138 may further include a positional-terrain compensation module 151 to assist n controlling the movement and locational awareness of the system. Further, the control device 138 may preferably further include multiple inputs and outputs to receive data from sensors 154 and monitoring devices as discussed further below.

According to a preferred embodiment, the Base Station Module 411 (shown in FIG. 4) preferably functions to perform RTK error calculations to enhance the precision of position data derived from the GPS system 157. Although the present invention is discussed with respect to GPS, the present invention also applies to data received from other positioning systems such as LORAN, GLONASS, Galileo, BeiDou and the like, as well as any combination of those like systems. As discussed further below with respect to FIGS. 5-8, the present RTK error calculations performed by the Base Station Module 411 are preferably provided to one or more drive towers to provide real-time corrections to individually received GPS location data. Additionally, RTK can utilize a single frequency (commonly known as the L1 band) for corrections, or can utilize dual frequencies (commonly known as the L1 and L2 bands). Further like correction technologies (such as WAAS, or Differential GPS) that enhance positional accuracy may be used. Preferably, any such systems would be compatible with the like positioning systems discussed above and provide positional accuracy better than 1 meter.

Figure 3:
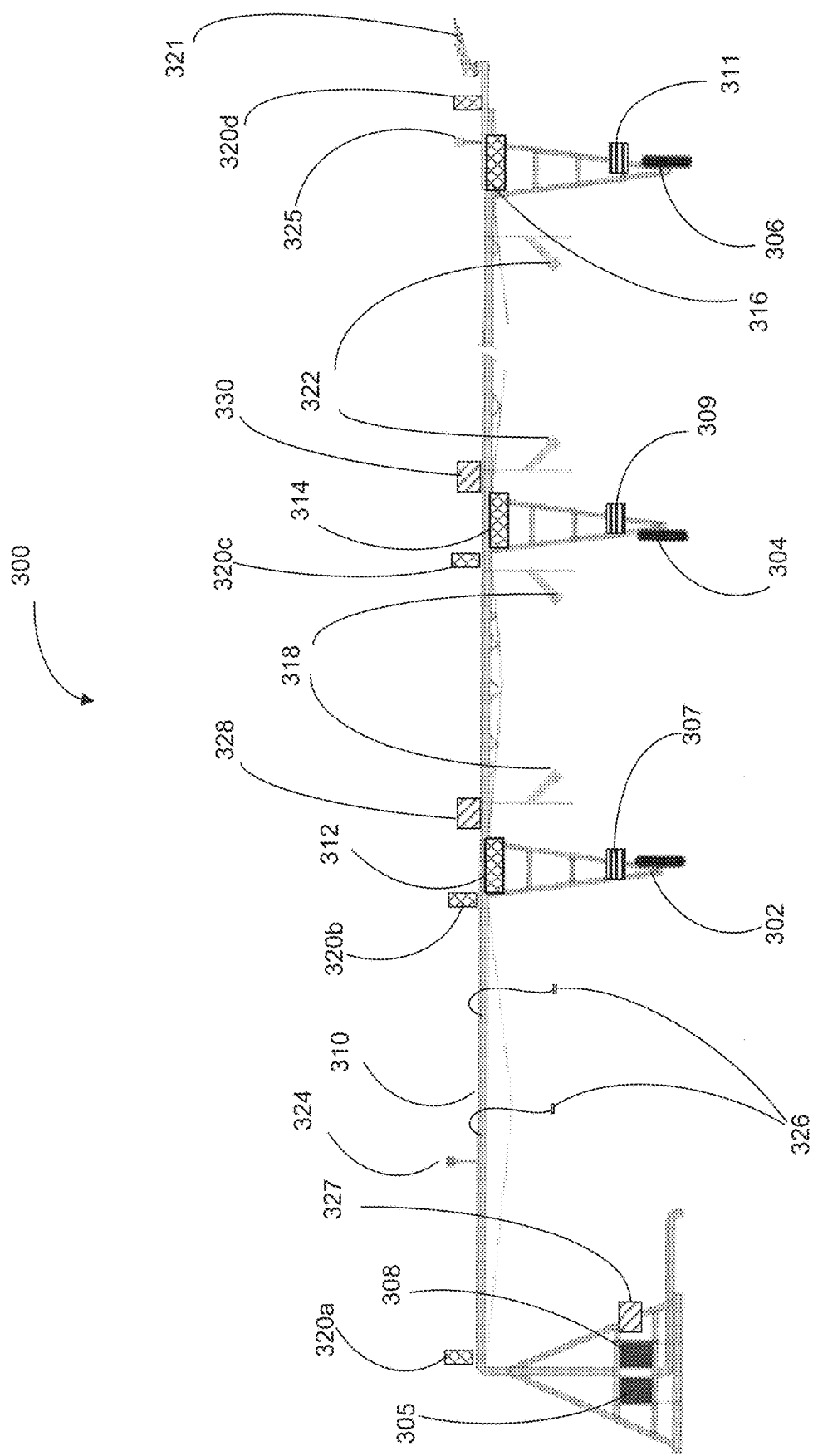
FIG. 3 shows a block diagram in accordance with further preferred embodiment of the present invention.

With reference now to FIG. 3, an exemplary system 300 incorporating aspects of the present invention shall now be further discussed. As further shown, an exemplary irrigation system 300 may include transducers 327, 328, 330 which are provided to control and regulate water pressure to sprinklers including the end gun 321 and other sprinkler heads 326.

Further the system may preferably include solid state tower boxes 312, 314, 316 (including the solid-state motor controllers, non-contact alignment devices and other components as discussed above) which are preferably interconnected to respective drive unit motors 307, 309, 311. As further shown, the respective drive unit motors 307, 309, 311 preferably provide torque and braking to respective sets of drive wheels 302, 304, 306. As discussed above, the system of the present invention may include any suitable motor for providing torque to a drive wheel. According to a preferred embodiment, the system of the present invention may preferably include motors such switch reluctance motors, induction motors and the like.

The system 300 of the present invention may also include a control box 305 and/or a pivot control box 308 which may together house control panels and hardware for implementing aspects of the present invention. For example, the control box 305 may house a control panel (such as control panel 403 shown in FIG. 4), elements of the controller device 138 and further hardware and software for executing aspects of the present invention. Likewise, the pivot control box 308 may house a pivot/control panel (such as pivot/control panel 402 shown in FIG. 4), elements of the controller device 138, and hardware and software for executing additional aspects of the present invention. The system of the present invention may also include GPS receivers 320*a-d* for receiving positional data and indirect crop sensors 318, 322 which preferably may include optional moisture sensors to determine the moisture levels in a given area of soil. Additionally, the sensors 318, 322 may further include optics to allow for the detection of crop type, stage of grown, health, presence of disease, rate of growth and the like. Still further, the system may include ground sensors. Still further, the detection system may further receive data from a connected or remote weather station or the like which is able to measure weather features such as humidity, wind speed, wind direction, pressure, precipitation, temperature and the like. Still further, the system may preferably further include a wired or wireless transceiver/router 324, 325 for receiving and transmitting signals between system elements and for receipt of RF/satellite signals. Further, the preferred system of the present invention may alternatively further include additional elements mounted to the span 310 such as additional sensors and the like.

Figure 4:
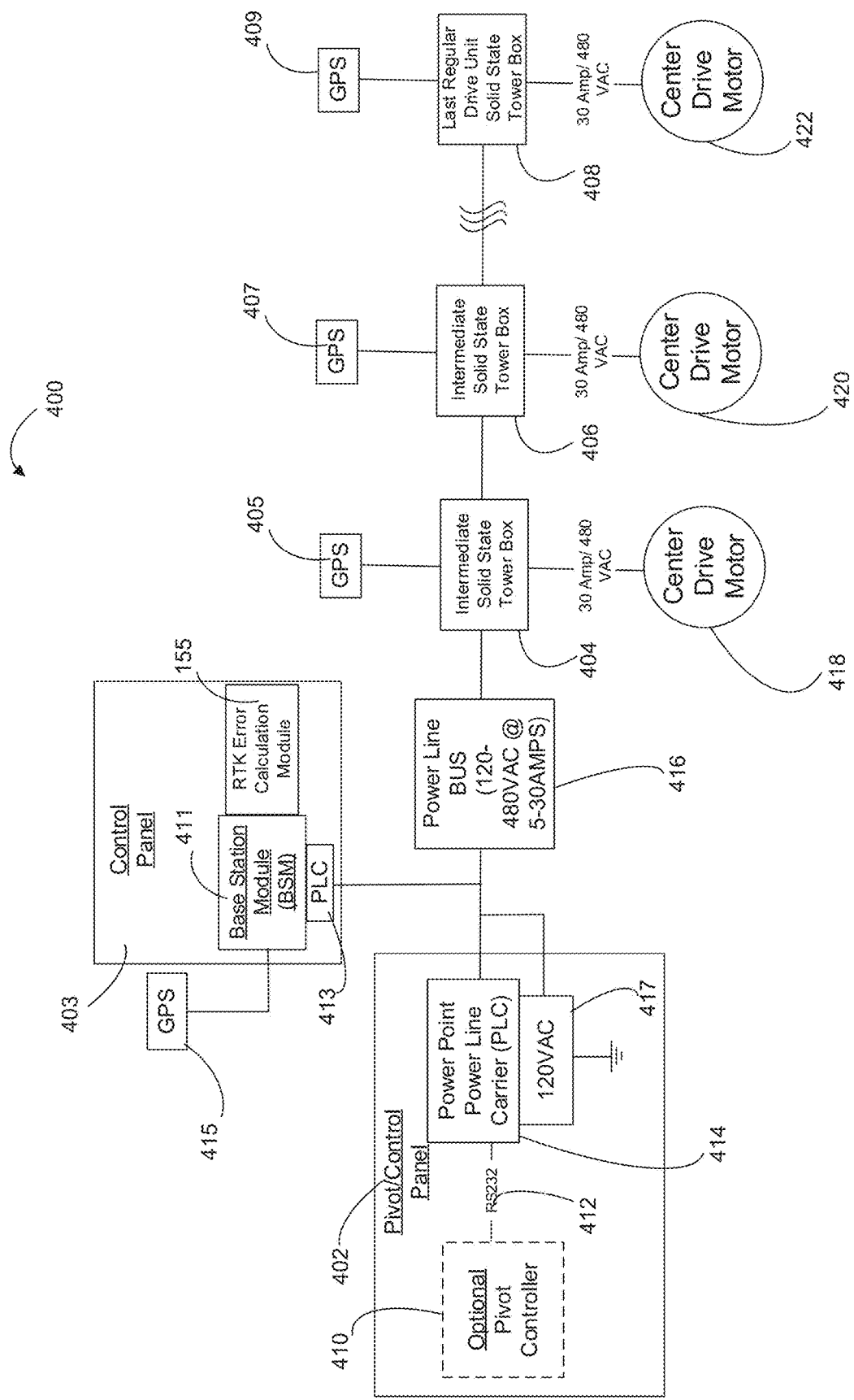
FIG. 4 shows a block diagram in accordance with further preferred embodiment of the present invention.

With reference now to FIG. 4, further aspects of the present invention shall now be further discussed. As shown in FIG. 4, the power/control system of the present invention 400 may preferably include a control/pivot panel 402 which preferably provides control signals and power to a series of intermediate solid-state tower boxes 404, 406 and a last regular drive unit tower box 408. As shown, each solid-state tower box 404, 406, 408 preferably further includes a GPS sensor/input 405, 407, 409. It should be understood that solid-state tower boxes are provided as an example and the present invention is not intended to be limited to the use of solid-state tower boxes. For example, electro-mechanical tower boxes may be used in place of the solid-state tower boxes without departing from the scope of the present invention.

As shown, the exemplary control/pivot panel 402 may include an optional pivot controller 410 and/or a power-line carrier (PLC) 414. The PLC 414 may control and direct power to downstream intermediate solid-state tower boxes 404, 406 and a last regular drive unit tower box 408 via a power-line BUS 416. The pivot controller 410 may be connected to the power-line carrier 414 via a serial communication connection 412 (i.e. RS-232) or the like. According to preferred embodiments, the power-line BUS 416 of the present invention may provide and direct power at any of a variety of different voltages and amps. For example, the power-line BUS 416 of the present invention may provide power over a range of voltages (such as between 0-1000 volts) and over a range of currents (such as 0.1 to 100 amps) as desired without limitation. According to a further preferred embodiment, the power may be provided at 120-480 volts with a current anywhere between 5-50 amps. For instance, the power-line BUS 416 may provide 120 volts AC at 5 amps. According to a further preferred embodiment, the power-line BUS 416 may preferably provide power at 480 volts AC at 30 amps. According to a further preferred embodiment, the power-line carrier of present invention may preferably operate as a one or two-way system.

With reference again to FIG. 4, an exemplary control panel 403 may include a Base Station Module (BSM) 411 and a PLC 413. The BSM 411 may receive GPS data from a GPS receiver 415 (or another geolocation device). The BSM 411 may further include an RTK. Error Calculation Module 155 or other function to allow the BSM 411 to receive RTK error data and produce RTK error correction data. As discussed further below, the BSM 411 preferably calculates and provides the RTK error correction data through the power-line carrier 413 to the downstream solid-state tower boxes 404, 406, 408 via a power-line BUS 416.

As further shown in FIG. 4, the RTK error correction data (along with power and control signals provided by the power-line box 416) are preferably first received by intermediate solid-state tower box 404 which preferably receives, processes and thereafter directs the received power to a center drive motor 418. Further, the RTK error correction data is preferably processed by the intermediate solid-state tower box 404 and used to correct/adjust the GPS location data received from the GPS module 405. Likewise, the power and control signals provided by the power-line box 416 are received by the intermediate solid-state tower box 406 which preferably receives, processes and thereafter directs the received power to center drive motor 420. Although not shown, any number of additional intermediate solid-state our boxes may further be incorporated as needed depending on the size of the irrigation system. Regardless of the number of intermediate solid-state toy tower boxes, the RTK error correction data and the power from the power-line bus 416 is preferably finally received at a last regular drive unit solid-state tower box 408 which preferably likewise receives and processes the received RTK error correction data as well as directs the received power to a center drive motor 422.

As further shown in FIG. 4, according to an alternative preferred embodiment, the system of the present may alternatively utilize a separate 120V 1-phase or similar power circuit 417 for allowing PLC communications between the main pivot controller 410 and/or the BSM 411 and the solid-state tower boxes 404, 406,408. According to further preferred embodiments, the power circuit 417 may be an alternative to PLC communications using the power line BUS 416 or in addition to power-line communications. According to alternative preferred embodiments, wireless signals may further be used to transmit RTK error correction data. According to alternative preferred embodiments, electromechanical tower boxes, VFD motor controllers, or the like may be used in place of the solid state tower boxes. Preferably, any such tower boxes contain a PLC module with the ability to receive GPS signals from the local receiver.

Figure 5A:
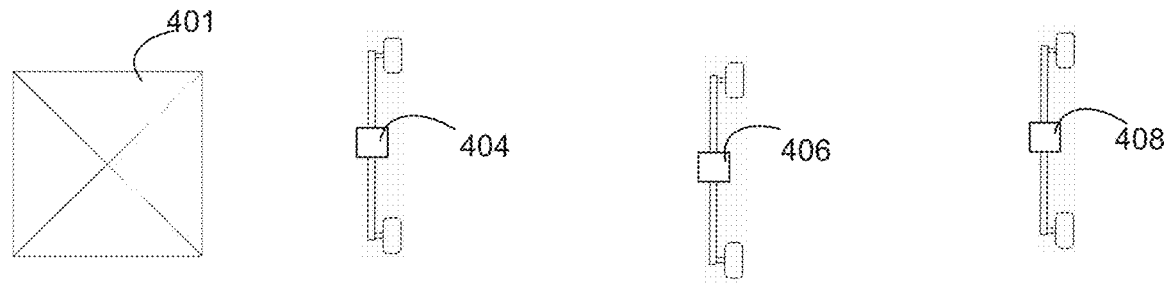
FIGS. 5A, 5B, and 5C illustrate a first alignment method in accordance with a further preferred embodiment of the present invention.
Figure 5B:
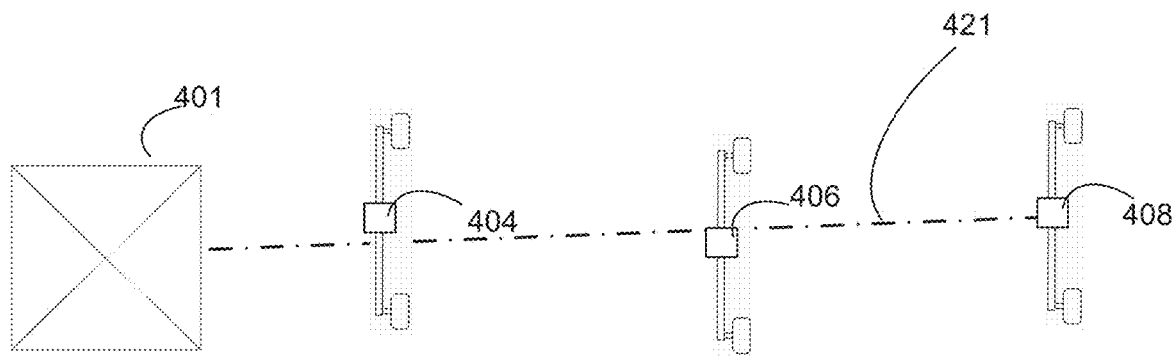
Figure 5C:
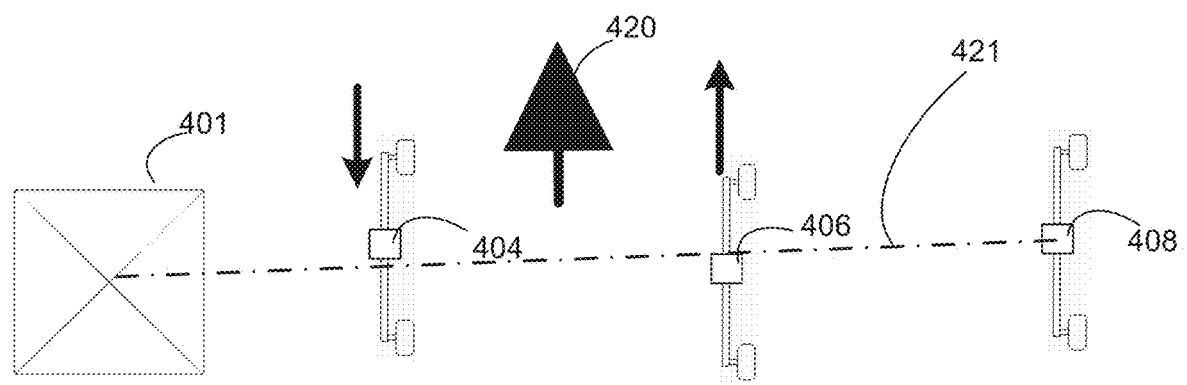
Figure 6:
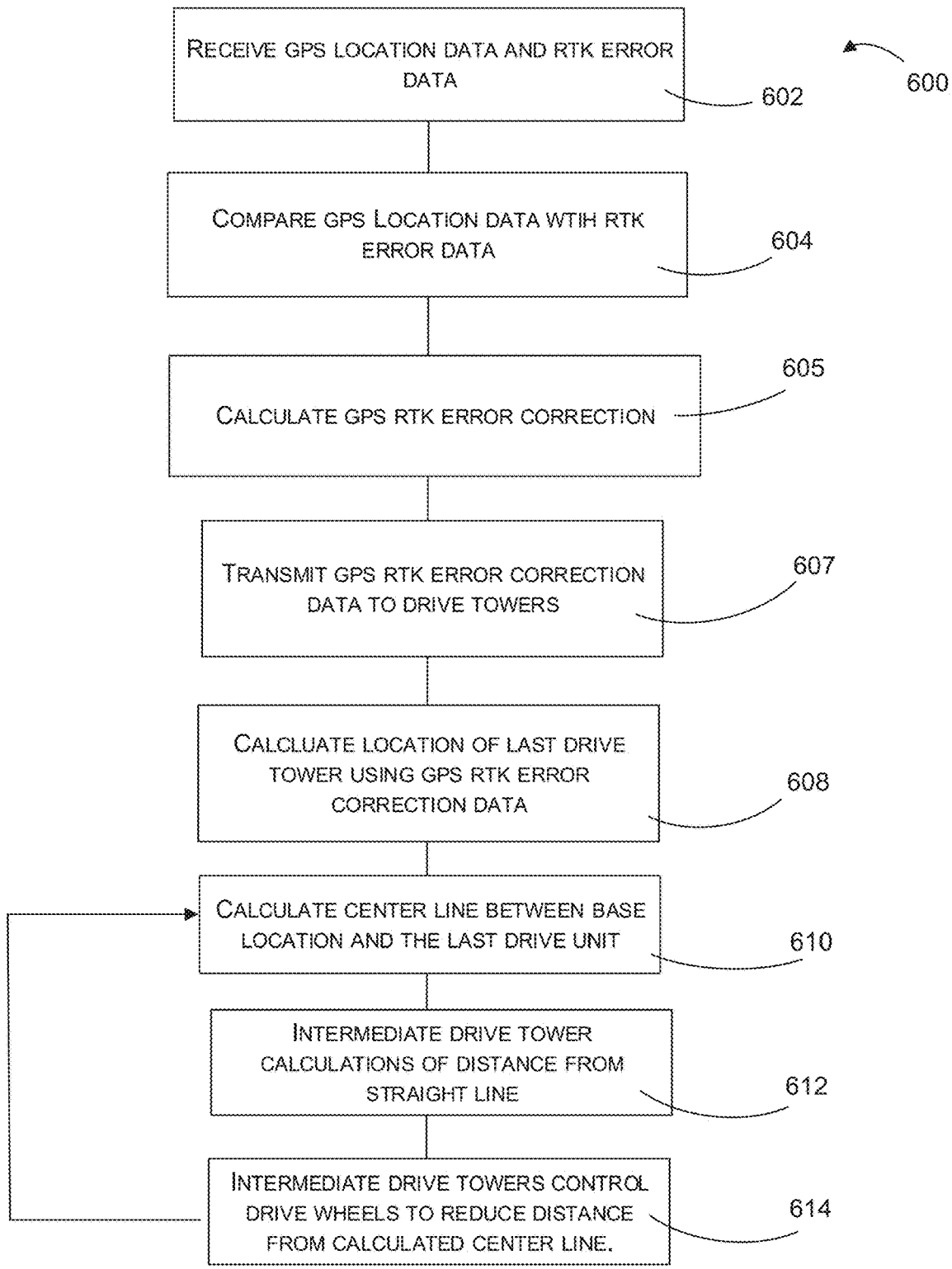
FIG. 6 shows a flow chart illustrating the first alignment method shown in FIGS. 5A, 5B and 5C.

With reference now to FIGS. 5A-C and 6, a preferred method in accordance with preferred embodiments of the present invention shall now be discussed. With reference to FIGS. 5 and 6, at a preferred first step 602, the base tower/pivot point 401 of the present invention preferably receives a first set of GPS location data and RTK error data. According to a preferred embodiment, the GPS and RTK error data may be received directly by respective GPS and RTK satellite receivers. Alternatively, this data may be input from memory or received from an outside network.

At a next step 604, the Base Station Module (BSM) 411 (shown in FIG. 3) preferably compares the GPS location data with the RTK error data. At a next step 605, the BSM 411 preferably calculates RTK error correction data. At a next step 607, the RTK error correction data is preferably transmitted via PLC to each downstream drive tower controller 404, 406, and 408.

At a next step 608, the location of the last drive tower 408 is calculated using GPS data and RTK error correction data. At a next step 610, the system preferably calculates a straight, center line 421 between the base/pivot location 401 and the last drive unit 408 (as shown in FIG. 5B). At a next step 612, the intermediate drive towers 404 and 406 preferably calculate the relative distances between their current calculated locations and the calculated center line 421. According to preferred embodiments, these calculations are preferably made using a linear regression algorithm or the like.

At a next step 614, the controllers for each intermediate drive tower 404, 406 preferably control their drive wheels to reduce distance between their current locations the calculated center line 421. For example, as shown in FIG. 5C, a first intermediate tower 404 is preferably controlled to reduce its speed so that the distance between itself and the center line 421 is reduced as the irrigation machine moves in a given direction 420. This may preferably be accomplished by adjusting the duty cycle of a start-stop motor, by reducing the RPM of a constant-move (variable speed) motor such as a switch reluctance motor or an induction motor driven by a variable frequency drive or by like methods. Similarly, a second intermediate tower 406 may preferably be controlled to increase its speed to reduce the distance between itself and the center line 421. Preferably, the calculations and adjustments by the drive towers 404, 406 in accordance with the present invention may be continually performed in real time to maintain alignment. Additionally, the BSM at the base 401 preferably continually sends out real-time kinematics (RTK) signals to all of the downstream towers to allow each tower controller to correct GPS errors in real-time.

According to an alternative preferred embodiment, the speed of a drive wheel may be controlled by adjusting or changing the programmed average speed of the drive wheel. In this way, a selected drive wheel may be programmed to stay in alignment longer even though the speed of the wheel may differ from other drive wheels. For example, this may be accomplished by waiting until a given drive wheel is 10 cm behind and then adjusting/increasing the average speed of the drive wheel until it is 10 cm ahead. The present invention may thus continually update the programmed average speed of each tower as necessary and may continually cycle between location detection and updating of programmed average speeds of each tower to minimize the misalignment of towers.

According to further preferred embodiments, the alignment algorithm of the present invention may operate when the machine is still or during the operation and running of the irrigation system. Further, the algorithm and system of the present invention may be used to initially align the towers every time the machine is started (i.e., at the beginning of the machine movement) rather than real-time, during the machine movement). According to a further preferred embodiment, the algorithm of the present invention may preferably include a margin error so that only towers located more than a set distance (i.e. two inches) from the centerline are instructed to reduce detected alignment errors. According to a further preferred embodiment, the order of alignment may be determined in the order of the outermost tower to the innermost tower. Further, the instructions for realigning the towers may be prioritized from the outermost tower to the innermost tower.

With reference now to FIGS. 7 and 8A-C, an alternative "three-tower" algorithm for use with the present invention shall now be discussed. According to an exemplary alternative algorithm, alignment may be calculated and adjusted for using selected groups of towers. In this way, the largest alignment errors within the groups of towers may be identified and locally adjusted for. According to a further preferred embodiment, groups of three towers are used and the position of each center ay preferably be first determined and then the positions of the two adjacent towers are determined.

Figure 7:
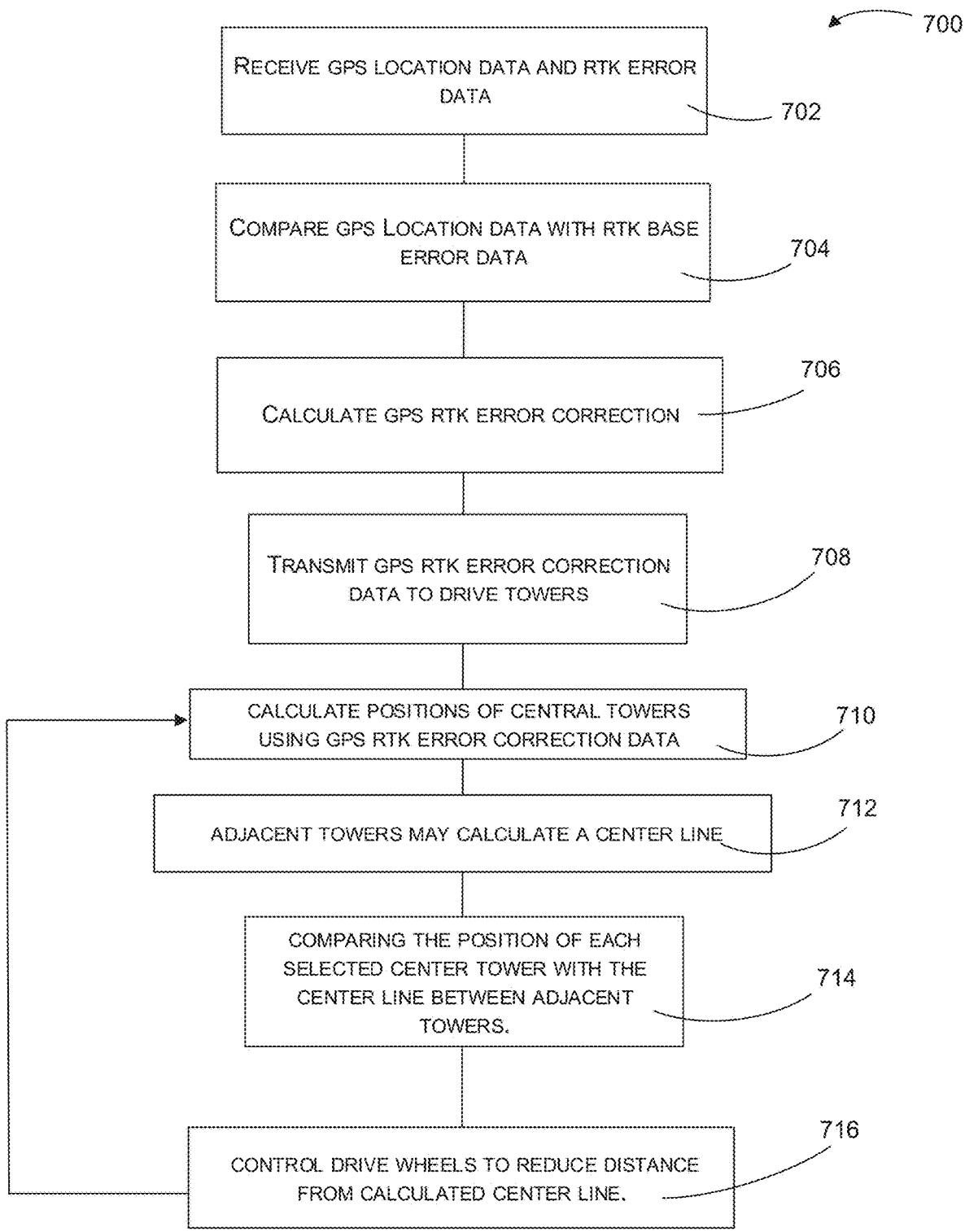
FIG. 7 provides a flow chart illustrating a second alignment method in accordance with further preferred embodiment of the present invention.

With reference to FIGS. 7 and 8, at a preferred first step 702, the base tower/pivot point 801 of the present invention preferably receives a first set of UPS location data and RTK error data. According to a preferred embodiment, the UPS and RTK error data may be received directly by respective UPS and RTK satellite receivers. Alternatively, this data may be input from memory or received from an outside network.

At a next step 704, the base tower/pivot point 801 may preferably compare the GPS location data with the RTK error data. At a next step 706, the BSM preferably calculates RTK error correction data. At a next step 708, the RTK error correction data is preferably transmitted to each downstream drive tower controller 804, 806, and 808.

Figure 8A:
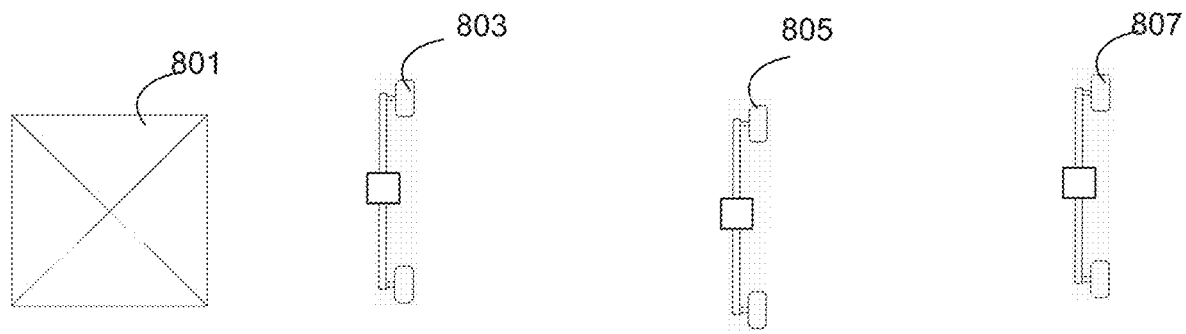
FIGS. 8A, 8B, and 8C illustrate the second alignment method illustrated in FIG. 7.
Figure 8B:
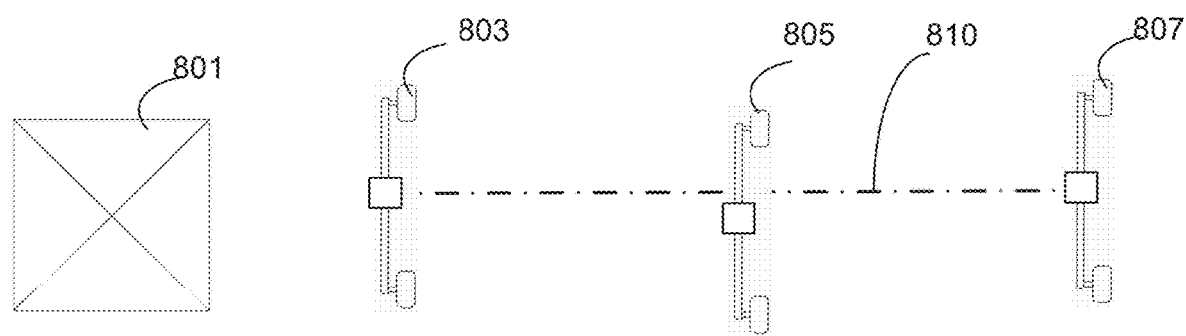

At next step 710, each drive tower may calculate its position using UPS data and RTK error correction data. At a next step 712, each pair of adjacent towers 803, 807 may preferably calculate a straight, center line 810 between themselves (as shown in FIG. 8B). At a next step 714, the center drive tower 805 may preferably calculate the relative distance between its current calculated location and the calculated center line 810.

Figure 8C:
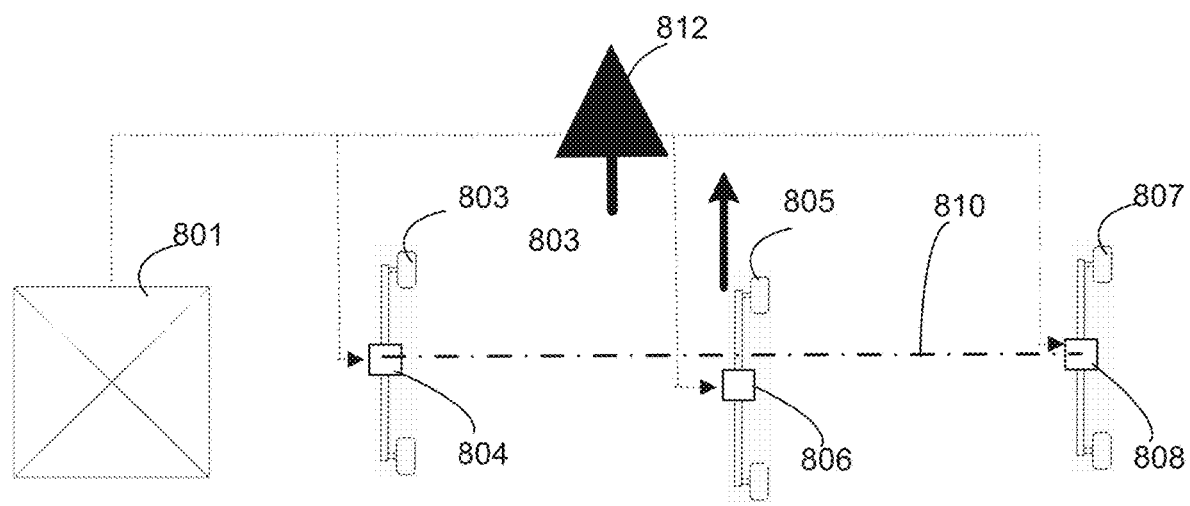

At a next step 716, the controller for the intermediate drive tower 805 preferably controls the drive wheels to reduce distance between their current locations the calculated center line 810. For example, as shown in FIG. 8C, the intermediate tower 805 is preferably controlled to increase its speed so that the distance between itself and the center line 810 is reduced while the irrigation machine travels in a given direction 812.

Preferably, multiple groups of towers may be simultaneously monitored and aligned. For example, the system may preferably analyze and align multiple three tower groups at the same time. Further, the "three-tower alignment" may preferably be run at every tower along the machine, beginning with the tower closest to the end tower and proceeding inward. The alignment could also be run simultaneously amongst all the towers. Additionally, the controller at the base 801 is preferably continually sending out real-time kinematics (RTK) signals to all of the downstream towers to allow each tower controller to correct GPS errors.

According to a further preferred embodiment, all the towers may be continuously aligned until all the "delta" lengths are within a certain threshold for alignment. During the alignment process, the end tower may preferably be moving to minimize stress on the span. According to further aspects of the present invention, it should be understood that the use of groups of three towers as discussed above is provided as a preferred example only. Alternatively, any other number of towers may be used as a group as well.

According to alternative embodiments, the present invention may utilize analog sensors on each tower. For example, a LORAN device could be located on each tower and the system may then, for example, utilize the three-tower alignment algorithm in conjunction with the triangulation data from the LORAN devices. Further, LORAN could also be utilized as a backup to the GPS sensors, in case the GPS sensors failed or became unavailable.

According to a further preferred embodiment, the GPS sensor of the present invention may preferably be placed as low to the ground as possible. Further, where a GPS sensor needs to be placed higher on a tower, any resulting terrain-caused tracking error may preferably be corrected or compensated for by utilizing an altimeter and/or gyroscope sensor data (such as in module 151 shown in FIG. 2) for the GPS sensor at the tower. In this case, the GPS coordinates reported by the sensor may be adjusted based on the amount of tilt in the tower (due to terrain slopes) as measured by a co-mounted altimeter and/or gyroscope sensor. Alternatively, if the UPS sensor is mounted closer to the pipe on the tower, then there is no need to compensate for terrain-induced tilt.

While the above descriptions regarding the present invention contain much specificity, these should not be construed as limitations on the scope, but rather as examples. Many other variations are possible. For example, the processing elements of the present invention by the present invention may operate on a number of different frequencies, voltages, amps and BUS configurations. Further, the communications provided with the present invention may be designed to be duplex or simplex in nature. Further, the systems of the present invention may be used with any arrangement of drive towers including both linear and center pivot systems. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A method for maintaining the alignment of an irrigation system having a plurality of connected spans supported by a first intermediate drive tower having a first drive wheel, a second intermediate drive tower having a second drive wheel, and a last regular drive unit (LRDU) tower, wherein the method comprises:
   receiving a first set of Global Positioning Satellite (GPS) location data and a second set of Real-Time Kinematics (RTK) error data;
   comparing the first set of GPS location data to a known geolocation;
   calculating RTK error correction data within a Base Station Module (BSM);
   transmitting RTK error correction data to the first intermediate drive tower, the second intermediate drive tower and the LRDU tower;
   receiving LRDU altimeter data at the LRDU tower;
   calculating the location of the LRDU tower using GPS data, the LRDU altimeter data and RTK error correction data;
   calculating a straight, center line between the center pivot and the LRDU tower;
   receiving first altimeter data at the first drive tower;
   calculating the first corrected location of the first intermediate drive tower using GPS data, the first altimeter data and RTK error correction data;
   calculating the distance between the first corrected location and the calculated center line;
   receiving second altimeter data at the second drive tower;
   calculating a second corrected location of the second intermediate drive tower using GPS data, the second altimeter data and RTK error correction data;
   calculating the distance between the second corrected location and the calculated center line;
   controlling the second drive wheel to reduce the distance between the second corrected location and the calculated center line; and controlling the first drive wheel to reduce the distance between the first corrected location and the calculated center line;

wherein the distances between each drive tower and the calculated center line are adjusted in order of the outermost tower from the BSM to the innermost tower;

wherein the speed of the second drive wheel is adjusted by changing the programmed average speed of the second drive wheel; wherein the programmed average speed of the second drive wheel is increased to exceed the programmed average speed of the first drive wheel;

wherein the BSM is connected to a first power-line carrier (PLC) circuit; wherein the BSM transmits RTK error correction data, power and control signals through the first PLC circuit via a power-line BUS to the first intermediate drive tower, the second intermediate drive tower and the LRDU tower.

2. A method for maintaining the alignment of an irrigation system having a plurality of connected spans supported by a first intermediate drive tower having a first drive wheel, a second intermediate drive tower having a second drive wheel, and a last regular drive unit (LRDU) tower, wherein the method comprises:

receiving a first set of Global Positioning Satellite (GPS) location data and a second set of Real-Time Kinematics (RTK) error data;

comparing the first set of GPS location data to a known geolocation;

calculating RTK error correction data within a Base Station Module (BSM);

transmitting RTK error correction data to the first intermediate drive tower, the second intermediate drive tower and the LRDU tower;

receiving LRDU gyroscopic data at the LRDU tower;

calculating the location of the LRDU tower using GPS data, the LRDU gyroscopic data and RTK error correction data;

calculating a straight, center line between the center pivot and the LRDU tower;

receiving first gyroscopic data at the first drive tower;

calculating the first corrected location of the first intermediate drive tower using GPS data, the first gyroscopic data and RTK error correction data;

calculating the distance between the first corrected location and the calculated center line;

receiving second gyroscopic data at the second drive tower;

calculating a second corrected location of the second intermediate drive tower using GPS data, the second gyroscopic data and RTK error correction data;

calculating the distance between the second corrected location and the calculated center line;

controlling the second drive wheel to reduce the distance between the second corrected location and the calculated center line; and controlling the first drive wheel to reduce the distance between the first corrected location and the calculated center line;

wherein the distances between each drive tower and the calculated center line are adjusted in order of the outermost tower from the BSM to the innermost tower;

wherein the speed of the second drive wheel is adjusted by changing the programmed average speed of the second drive wheel; wherein the programmed average speed of the second drive wheel is increased to exceed the programmed average speed of the first drive wheel;

wherein the BSM is connected to a first power-line carrier (PLC) circuit; wherein the BSM transmits RTK error correction data, power and control signals through the first PLC circuit via a power-line BUS to the first intermediate drive tower, the second intermediate drive tower and the LRDU tower.

\* \* \* \* \*